(12) United States Patent
Jin

(10) Patent No.: US 10,831,490 B2
(45) Date of Patent: Nov. 10, 2020

(54) DEVICE AND METHOD FOR SCHEDULING MULTIPLE THREAD GROUPS ON SIMD LANES UPON DIVERGENCE IN A SINGLE THREAD GROUP

(71) Applicant: SAMSUNG ELECTRONICS CO., LTD., Suwon-si (KR)

(72) Inventor: Seung-Hun Jin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 366 days.

(21) Appl. No.: 14/786,417

(22) PCT Filed: Apr. 22, 2014

(86) PCT No.: PCT/KR2014/003504
§ 371 (c)(1),
(2) Date: Oct. 22, 2015

(87) PCT Pub. No.: WO2014/175636
PCT Pub. Date: Oct. 30, 2014

(65) Prior Publication Data
US 2016/0132338 A1 May 12, 2016

(30) Foreign Application Priority Data
Apr. 22, 2013 (KR) .................. 10-2013-0044433

(51) Int. Cl.
*G06F 9/38* (2018.01)
*G06F 9/30* (2018.01)
(52) U.S. Cl.
CPC ........ *G06F 9/3802* (2013.01); *G06F 9/30058* (2013.01); *G06F 9/30145* (2013.01);
(Continued)

(58) Field of Classification Search
CPC ..... G06F 9/3851; G06F 9/3887; G06F 9/3889
See application file for complete search history.

(56) References Cited

U.S. PATENT DOCUMENTS 7,353,369 B1 4/2008 Coon et al.
7,543,136 B1 6/2009 Coon et al.
(Continued)

FOREIGN PATENT DOCUMENTS

KR 10-0735944 B1 7/2007
KR 10-2007-0100797 A 10/2007
(Continued)

OTHER PUBLICATIONS

Frey, S.; Reina, G.; Ertl, T. "SIMT Microscheduling: Reducing Thread Stalling in Divergent Iterative Algorithms" Proceedings of the 2012 20th Euromicro International Conference on Parallel, Distributed and Network-Based Processing (PDP 2012): 399-406;xiv+632. IEEE Computer Society. (2012).*
(Continued)

*Primary Examiner* — Jacob Petranek
(74) *Attorney, Agent, or Firm* — Sughrue Mion, PLLC

(57) ABSTRACT

Provided are an apparatus and a method for effectively managing threads diverged by a conditional branch based on Single Instruction Multiple-based Data (SIMD). The apparatus includes: a plurality of Front End Units (FEUs) configured to fetch, for execution by SIMD lanes, instructions of thread groups of a program flow; and a controller configured to schedule a thread group based on SIMD lane availability information, activate an FEU of the plurality of FEUs, and control the activated FEU to fetch an instruction for processing the scheduled thread group.

21 Claims, 4 Drawing Sheets

(52) U.S. Cl.
CPC .......... *G06F 9/3836* (2013.01); *G06F 9/3851* (2013.01); *G06F 9/3887* (2013.01)

(56) References Cited

U.S. PATENT DOCUMENTS

| | | | |
|---|---|---|---|
| 7,594,095 B1 | 9/2009 | Nordquist | |
| 7,613,904 B2 | 11/2009 | Jones et al. | |
| 7,617,384 B1 * | 11/2009 | Coon | G06F 9/3851 712/220 |
| 7,761,697 B1 * | 7/2010 | Coon | G06F 9/322 712/233 |
| 7,925,861 B2 | 4/2011 | Stuttard et al. | |
| 8,060,724 B2 | 11/2011 | Moyer | |
| 8,381,203 B1 * | 2/2013 | Beylin | G06F 8/458 717/149 |
| 2002/0083311 A1 | 6/2002 | Paver | |
| 2011/0219221 A1 | 9/2011 | Skadron et al. | |
| 2012/0089792 A1 | 4/2012 | Fahs et al. | |
| 2012/0166762 A1 | 6/2012 | Park et al. | |
| 2012/0194526 A1 | 8/2012 | Sander et al. | |
| 2012/0198425 A1 | 8/2012 | Eichenberger et al. | |
| 2013/0042090 A1 * | 2/2013 | Krashinsky | G06F 9/3016 712/214 |
| 2014/0136816 A1 * | 5/2014 | Krig | G06F 15/8007 712/15 |
| 2014/0164737 A1 * | 6/2014 | Collange | G06F 9/30072 712/205 |
| 2014/0181477 A1 * | 6/2014 | Vaidya | G06F 9/30018 712/208 |
| 2015/0143083 A1 * | 5/2015 | Le | G06F 9/30018 712/205 |

FOREIGN PATENT DOCUMENTS

| | | |
|---|---|---|
| KR | 10-2011-0055629 A | 5/2011 |
| KR | 10-2012-0074762 A | 7/2012 |

OTHER PUBLICATIONS

Nicolas Brunie; Sylvain Collange; Gregory Diamos. "Simultaneous branch and warp interweaving for sustained GPU performance" Computer Architecture (ISCA), 2012 39th Annual International Symposium on Jun. 9-13, 2012, IEEE.*

Jiayuan Meng; David Tarjan; Kevin Skadron. "Dynamic Warp Subdivision for Integrated Branch and Memory Divergence Tolerance" ACM, 2010.*

Communication dated Jul. 31, 2014 issued by the International Searching Authority in counterpart International Application No. PCT/KR2014/003504 (PCT/ISA/210).

Gregory Diamos et al; "SIMD Re-Convergence At Thread Frontiers"; MICRO 11 Journal; Dec. 3, 2011; 12 pgs. total.

Nicolas Brunie et al., "Simultaneous branch and warp interweaving for sustained GPU performance", 39th Annual International Symposium on Computer Architecture, Jun. 2012, (pp. 49-60).

Jiayuan Meng et al., "Dynamic warp subdivision for integrated branch and memory divergence tolerance", Proceedings of the 37th annual international symposium on Computer architecture, Jun. 2010, (pp. 235-246).

* cited by examiner

DEVICE AND METHOD FOR SCHEDULING MULTIPLE THREAD GROUPS ON SIMD LANES UPON DIVERGENCE IN A SINGLE THREAD GROUP

CROSS-REFERENCE TO RELATED APPLICATION

This application is a National Stage application under 35 U.S.C. § 371 of PCT/KR2014/003504, filed on Apr. 22, 2014, which claims priority from Korean Patent Application No. 10-2013-0044433, filed on Apr. 22, 2013 in the Korean Intellectual Property Office, all the disclosures of which are incorporated herein in their entireties by reference.

BACKGROUND

1. Field

Apparatuses and methods consistent with exemplary embodiments relate to efficiently managing threads diverged by a conditional branch based on Single Instruction Multiple Data (SIMD) architecture.

2. Description of the Related Art

For graphics applications and physics calculations that utilize repetitive calculations of enormous amounts of data, a Single Instruction Multiple Data (SIMD) programming model capable of processing multiple data with a single instruction is used. These days, an SIMD programming model that runs parallelism at thread level is widely utilized. That is, in order to flexibly support the SIMD programming model, each SIMD lane processes one logical thread rather than one piece of data.

Yet, since each SIMD lane corresponds to a single logical thread, each SIMD lane may follow a different control flow at a conditional branch. If an instruction for a different control flow is issued, other SIMD lanes that do not need to execute the instruction are idle, leading to performance degradation. In order to solve the above drawback, a flag is used to distinguish threads that need to be executed at each conditional branch, and to incorporate idled SIMD lane into threads of other thread groups having the same Program Counter (PC). However, even such a method is not expected to yield higher efficiency since correlations between thread groups should be monitored, and processing speeds usually differ between thread groups.

SUMMARY

According to aspects of one or more exemplary embodiments, there are provided an apparatus for managing divergent threads based on Single Instruction Multiple Data (SIMD) architecture that includes two or more Front End Units (FEUs), and a method of managing divergent threads to minimize idle SIMD lanes and improve performance in case the control thereof is divided due to the divergence through the apparatus.

According to an aspect of an exemplary embodiment, there is provided an apparatus for managing divergent threads based on Single Instruction Multiple Data (SIMD) architecture, the apparatus including: a plurality of Front End Units (FEUs) configured to fetch, for execution by SIMD lanes, instructions of thread groups of a program flow; and a controller configured to schedule a thread group based on SIMD lane availability information, activate an FEU of the plurality of FEUs, and control the activated FEU to fetch an instruction for processing the scheduled thread group.

The controller may include an active thread manager configured to, in response to thread divergence occurring in the scheduled thread group due to a branch instruction, manage active thread information of the divergent thread group.

The controller may further include an SIMD manager configured to manage the SIMD lane availability information by checking any available SIMD lanes based on the managed active thread information.

The apparatus may further include a distribution network configured to transfer the instruction fetched by the activated FEU to a corresponding SIMD lane based on the managed active thread information.

A plurality of SIMD lanes may be provided, and each SIMD lane may include an Execution Unit (EU) configured to execute a corresponding instruction transferred through the distribution network.

The controller may schedule the thread group based on at least one of memory access characteristics, computation latency, and user input information with respect to the thread group.

The controller may determine one or more thread group based on a number of idle SIMD lanes included in the SIMD lane availability information, and schedule an SIMD width and an SIMD depth for the one or more determined thread groups.

Before threads of the scheduled thread group are diverged, or after divergent threads of the scheduled thread group are converged, the controller may activate the FEU to fetch an instruction that controls the FEU to process the scheduled thread group using all of the SIMD lanes.

According to an aspect of another exemplary embodiment, there is provided a method for managing divergent threads based on a Simple Instruction Multiple Data (SIMD) architecture, the method including: fetching, at a first Front End Unit (FEU) among a plurality of FEUs, an instruction of a first thread group for execution by SIMD lanes; determining, at the first FEU, whether threads of the first thread group are diverged due to the fetched instruction; in response to a determination that the threads of the first thread group are diverged, activating a second FEU among the plurality of FEUs; scheduling, based on SIMD lane availability information, a second thread group to be processed through the second FEU; and fetching, at both the first FEU and the second FEU, instructions for execution by the SIMD lanes.

The method may further include managing active thread information of each of the first thread group and the second thread group.

The managing of the active thread information may include managing SIMD lane availability information by checking an available SIMD lane based on the managed active thread information of each of the first thread group and the second thread group.

The method may further include, in response to the determination that the threads of the first thread group are diverged, managing SIMD lane usage status information that indicates information about any SIMD lane that was being used at a time shortly before the threads of the first thread group are diverged.

The method may further include, in response to the determination that the threads of the first thread group are diverged due to a conditional branch, jumping into a Taken Program Counter (PC).

The method may further include further determining whether the instruction fetched by the first FEU is a branch-join instruction; in response to a determination that the fetched instruction is the branch-join instruction, determining whether there is any Not-Taken PC not processed due to the thread divergence of the first thread group; and in response to a determination that there is no Not Taken PC not processed due to the thread divergence of the first thread group, fetching an instruction based on the SIMD lane usage status information to process the first thread group.

The scheduling the second thread group may include scheduling the second thread group based on at least one of memory access characteristics, computation latency, and user input information with respect to the second thread group.

The scheduling the second thread group may include determining the second thread group based on a number of idle SIMD lanes included in the SIMD lane availability information, and scheduling an SIMD width and an SIMD depth of the second thread group.

According to an aspect of another exemplary embodiment, there is provided a method of managing divergent threads based on SIMD architecture, the method including: scheduling a first thread group of a program flow based on SIMD lane availability information; activating a first FEU among a plurality of FEUs configured to fetch instructions for execution by SIMD lanes; and fetching, at the activated first FEU, a first instruction for processing the scheduled first thread group.

According to aspects of one or more exemplary embodiments, in the case the control thereof is divided due to the divergence through an apparatus and a method for managing divergent threads based on SIMD architecture, an optimum time-space division process is applied to each thread group to increase the idle SIMD lane availability and improve the processing performance.

DESCRIPTION OF DRAWINGS

The above and/or other aspects will become apparent and more readily appreciated from the following description of certain exemplary embodiments, taken in conjunction with the accompanying drawings, in which.

DETAILED DESCRIPTION OF EXEMPLARY EMBODIMENTS

Figure 1:
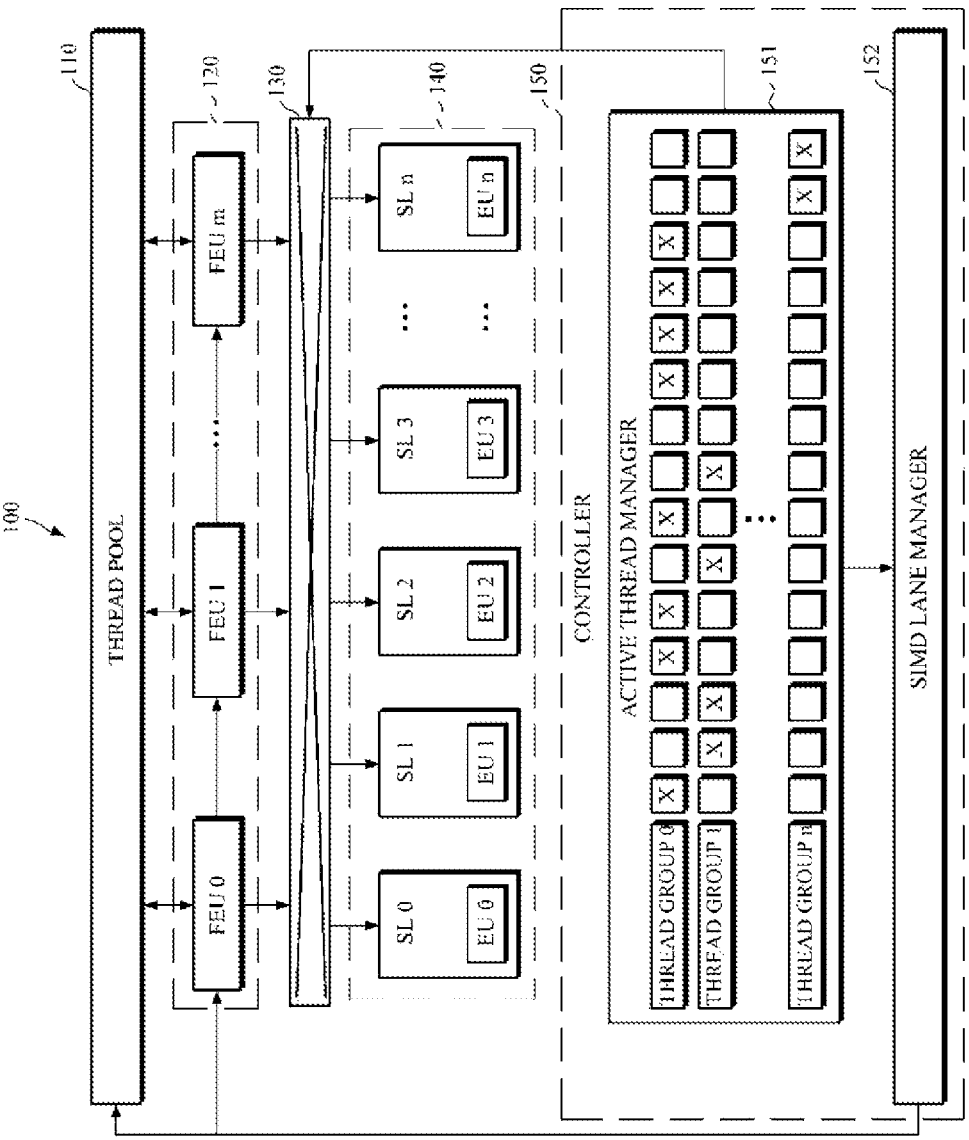
FIG. 1 is a diagram illustrating a configuration of an apparatus for managing divergent threads based on an SIMD architecture according to an exemplary embodiment.

The following description is provided to assist the reader in gaining a comprehensive understanding of the methods, apparatuses, and/or systems described herein. Accordingly, various changes, modifications, and equivalents of the methods, apparatuses, and/or systems described herein will be understood to those of ordinary skill in the art. Also, descriptions of well-known functions and constructions may be omitted for increased clarity and conciseness. Expressions such as "at least one of," when preceding a list of elements, modify the entire list of elements and do not modify the individual elements of the list.

Throughout the drawings and the detailed description, unless otherwise described, the same drawing reference numerals will be understood to refer to the same elements, features, and structures. The relative size and depiction of these elements may be exaggerated for clarity, illustration, and convenience.

Hereinafter, an apparatus and a method for managing divergent threads based on a Single Instruction Multiple Data (SIMD) architecture, according to one or more exemplary embodiments, will be provided with reference to drawings.

FIG. 1 is a block diagram illustrating an apparatus 100 for managing divergent threads based on an SIMD architecture according to an exemplary embodiment. An apparatus 100 for managing divergent threads may be a data processing apparatus based on an SIMD architecture, which is designed for processing multiple data, that is, multiple threads, using a single instruction. A general apparatus for processing data based on an SIMD architecture processes multiple threads using a single instruction by scheduling the threads on the basis of a unit of a thread group.

Referring to FIG. 1, the apparatus 100 includes a Front End Unit (FEU) 120, a distribution network 130, an SIMD Lane 140, and a control unit 150 (i.e., controller).

The FEU 120 fetches and interprets an instruction, and the distribution network 130 delivers the instruction fetched by the FEU 120 to the SIMD lane 140.

Unlike a related art apparatus for processing data based on an SIMD architecture, the apparatus 100 according to the present exemplary embodiment may include two or more FEUs 120 (FEU 0~FEU m), and two or more SIMD lanes 140 (SL 0~SL n). Each of the SIMD lanes 140 includes a different Execution Unit (EU) (EU 0~EU n). The number of FEUs 120 included in the apparatus 100 may be fewer than the number of the SIMD lanes 140, although it is understood that one or more other exemplary embodiments are not limited thereto.

A related art apparatus for processing data based on an SIMD architecture includes only one FEU, and the FEU utilizes all of the SIMD lanes to fetch an instruction for processing multiple threads. However, if threads are diverged by a conditional branch instruction fetched in the middle of a program flow, some of the SIMD lanes become idle so processing performance may be degraded.

As described in the following, the apparatus 100 according to the present exemplary embodiment includes two or more FEUs, such that if any SIMD lane becomes idle due to an occurrence of thread divergence, the apparatus 100 is able to efficiently process threads using the idle SIMD lane.

Based on SIMD lane availability information, the control unit 150 schedules a thread group, which is to be processed upon execution of an instruction fetched by the FEU 120. The scheduled thread group waits in a corresponding SIMD lane 140 of a thread pool 110 to be processed.

The control unit 150 may activate at least one FEU 120 among one or more FEUs (FEU 0~FEU m), and control the at least one active FEU 120 to fetch an instruction for processing a corresponding thread group.

Meanwhile, the control unit 150 may include an active thread manager 151 configured to manage active thread information of each thread group that is to be scheduled in the thread pool 110. The active thread information is information about any active thread of a thread group. In other words, the active thread information is information about a thread that is to be processed by an instruction, fetched by the FEU 120, and then written-back in a register file. The active thread manager 151 may be a space (e.g., a stack memory) to store the active thread information.

For example, if threads of a thread group are diverged by a conditional branch, only some threads belonging to the thread group may be activated according to a Taken path or a Not-Taken path. In addition, if a prospective thread group is scheduled using any available SIMD lane, active thread information about the scheduled thread group is managed by the active thread manager 151.

By way of example, if the number of SIMD lanes 140 is 16 (n=15), it is possible to determine the following with reference to the active thread manager 151 in FIG. 1: only eight out of the sixteen threads of thread group 0 are active, and only four out of the sixteen threads of thread group 1 are active.

The control unit 150 may include an SIMD lane manager 152. The SIMD lane manager 152 is configured to manage SIMD lane availability information, which includes IDs and the number of available SIMD lanes, and SIMD lane usage status information, which indicates information about any SIMD lane that was being used shortly before thread divergence occurs. Like the active thread manager 151, the SIMD lane manager 152 may be a stack memory that is a space to store various kinds of information. The control unit 150 may sense IDs, the number of available SIMD lanes based on the active thread information of a thread group, and the active thread information, which is managed by the active thread manager 151. As such, the sensed SIMD lane availability information may be written back in the SIMD lane manager 152 for management.

For example, the control unit 150 activates a predetermined FEU, for example, FEU 0. If the number of SIMD lanes 140 shown in FIG. 1 is 16 (n=15), all of the SIMD lanes 140 (SL 0~SL 15) may be available initially. Thus, the control unit 150 may schedule thread group 0 by scheduling an SIMD width and an SIMD depth of the thread group 0 to be 16 and 1, respectively, so that sixteen threads of the thread group 0 in sixteen SIMD lanes 140 (SL 0~SL 15) are processed all at once.

Furthermore, in the present example, the active FEU 0 fetches an instruction to process the thread group 0, and the distribution network 130 delivers the fetched instruction to each of the SIMD lanes 140 (SL 0~SL 15). At this point, the distribution network 130 may deliver the instruction to each SIMD lanes 140 with reference to the active thread manager 151. Once the SIMD lanes 140 (SL 0~SL 15) receive instructions, the SIMD lanes 140 (SL 0~SL 15) execute the instructions through each of the EUs (EU 0~EU 15) or FEUs (FEU 0~FEU 15) to process each thread, and record the processing results in a register file. When the processing is completed, an operation in which a Program Counter (PC) value is increased and then the FEU 0 fetches a subsequent instruction, is repeated.

Specifically, if a conditional branch exists in the program flow, the FEU 0 may fetch a branch instruction. As a result, if threads of the thread group 0 are diverged, the control unit 150 may write back active thread information of the thread group 0 in the active thread manager 151. In addition, in the SIMD lane manager 152, the control unit 150 may write back SIMD lane usage status information, which is information about any SIMD lane that was being used shortly before the threads of the thread group 0 were diverged. Further, the control unit 150 may sense SIMD lane availability information based on the active thread information written back in the active thread manager 151, and write back the sensed SIMD lane availability information in the SIMD lane manager 152.

If any SIMD lane 140 becomes idled when the thread group 0 follows a Taken instruction branch, the control unit 150 may schedule a thread group to execute a corresponding instruction through the idled SIMD lane 140 by activating at least one of the currently-inactivated FEUs (FEU 1~FEU m). In this case, the control unit 150 may schedule the thread group based on the number of available SIMD lanes 140.

For example, the control unit 150 may perform scheduling such that another FEU (e.g., FEU 1) is activated to process the Not-Taken path for the thread group 0 or process threads of a different thread group (e.g., thread group 1) using all or some of the available SIMD lanes 140.

Alternatively, the control unit 150 may perform scheduling such that two or more FEUs (e.g., FEU 1 and FEU 3) are activated to process two or more thread groups (e.g., the Not-Taken instruction branch for the thread group 0, and at least one of thread group 1, thread group 2, and thread group 3) using the available SIMD lanes 140 divided into two or more groups.

In addition, the control unit 150 may schedule a thread group based on memory access characteristics, operation latency, and user input information with respect to the thread group. For example, if the thread group 1 and the thread group 2 frequently access a specific address, the control unit 150 may perform scheduling such that two FEUs (FEU 1 and FEU 2) are activated to simultaneously process thread group 1 and thread group 2 using available SIMD lanes 140 divided into two groups.

In the event that computation latency occurs, for example, when there is an execution of an instruction indicating that a PC value is four clock cycles and when a specific thread group is scheduled to be processed using all of the available SIMD lanes 140, the specific thread group may be switched over a different thread group at the next cycle. In this case, the control unit 150 may schedule the specific thread group to be processed using only four SIMD lanes out of all available SIMD lanes 140 during four clock cycles, and schedule a different thread group using the other available SIMD lanes 120.

If the FEU 0 fetches a branch-join instruction and the Not-Taken path ends, the control unit 150 controls the branches to be converged, and continues to process the thread group 0 using the currently available SIMD lanes 140. If a newly scheduled thread group based on the SIMD lane availability information is completely processed, the control unit 150 may fetch pre-divergence SIMD lane usage status information from the SIMD lane manager 152, and schedule the thread group 0 based on the pre-divergence SIMD lane usage status information for processing.

Figure 2:
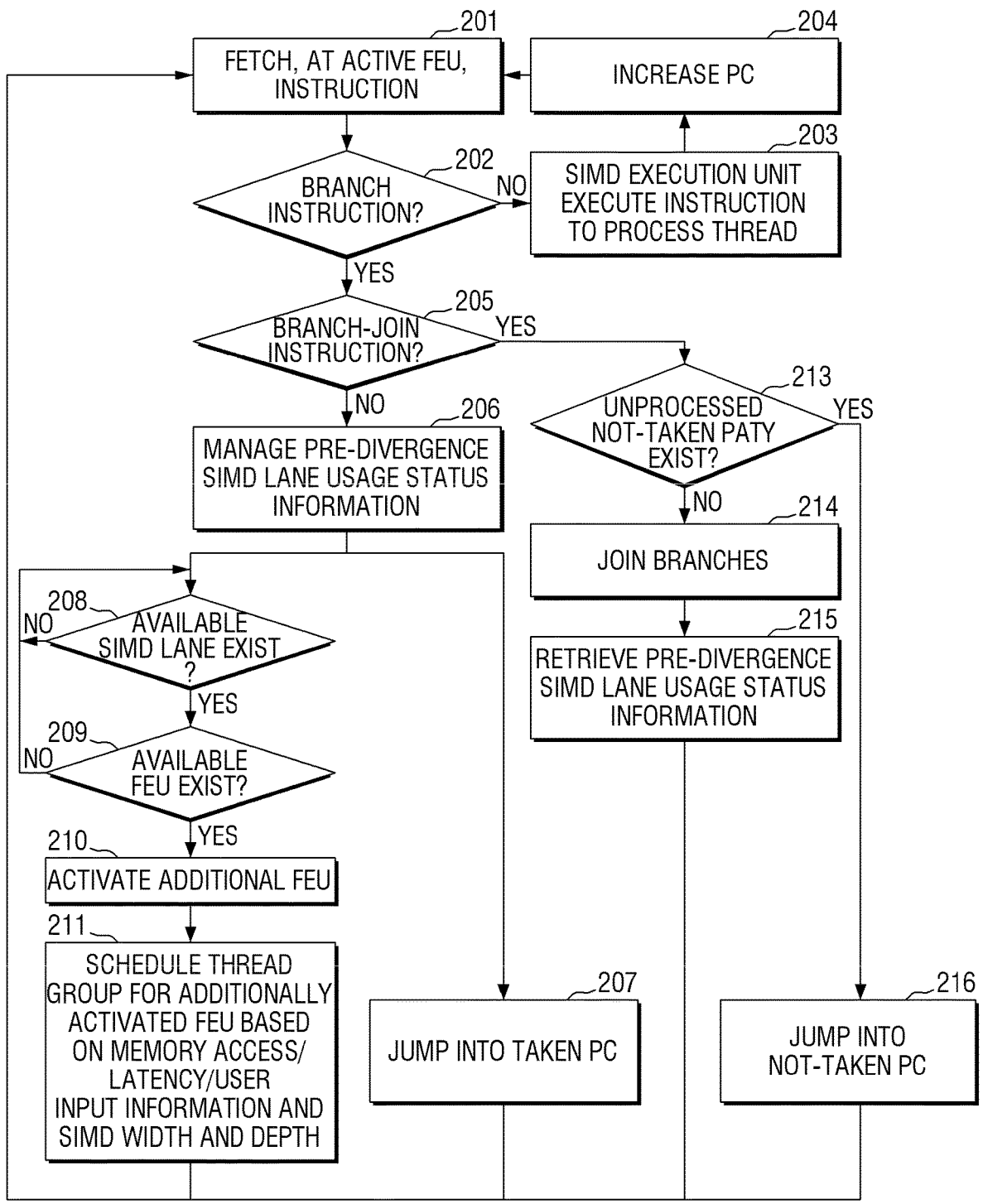
FIG. 2 is a flowchart illustrating a method for managing divergent threads based on an SIMD architecture according to an exemplary embodiment.

FIG. 2 is a flowchart illustrating a method for managing divergent threads based on an SIMD architecture according to an exemplary embodiment. The method illustrated in FIG. 2 may be performed by the apparatus 100 shown in FIG. 1.

Referring to FIG. 2, an active FEU 120 fetches an instruction in operation 201. As described above, before thread divergence occurs in the middle of a program flow, or when divergent threads are converged after the thread divergence ends, one predetermined FEU 120 is activated to operate as an SIMD lane. However, after the thread divergence occurs in the middle of a program flow, one or more FEUs 120 may be activated.

If it is determined in operation 202 that the instruction fetched by the FEU 120 is not a conditional branch instruction, the fetched instruction is delivered through the distribution network 130 to a corresponding SIMD lane 140 and then execution units (EU 0~EU n) execute the instruction to process a thread in operation 203. A PC value is increased in operation 204, and the currently activated FEU 120 fetches an instruction indicating the increased PC value in operation 201.

The above-described process is performed repeatedly until a branch instruction is fetched at a conditional branch in the middle of a program flow. If it is determined in operation 202 that the instruction fetched by the FEU 120 is a conditional branch instruction, whether the conditional branch is an instruction causing a thread to be diverged or a branch-join instruction causing divergent threads to be converged is determined in operation 205.

If it is determined in operation 205 that the fetched instruction is an instruction causing thread divergence, lane usage status information of any currently available SIMD lane (hereinafter referred to as "SIMD lane usage status information") is written back in the SIMD lane manager 152 for management in operation 206. That is, the SIMD lane usage status information is usage status information of any SIMD lane that was being used shortly before the thread divergence occurred.

For example, the SIMD lane manager 152 may include a J-STACK configured to store SIMD lane usage status information and an N-STACK configured to store SIMD lane availability information. If threads are diverged by a conditional branch, the SIMD lane usage status information is pushed into the J-STACK.

Meanwhile, the thread manager 151 manages active thread information of threads that follow a Taken path for a corresponding thread group upon thread divergence.

In addition, if the active thread information regarding the thread group is written back in the active thread manager 151, a Not-Taken PC and a Not-Taken SIMD lane, that is, information about any SIMD lane that has become available due to the thread divergence, are pushed into the N-STACK.

Then, the flow jumps into a Taken PC due to the thread divergence in operation 207, and the currently activated FEU 120 is controlled to fetch an instruction located at the Taken PC. If the FEU 120 fetches the instruction located at the Taken PC in operation 201, whether the fetched instruction is an instruction causing additional thread divergence is determined in operation 202. If it is determined that the fetched instruction is not an instruction causing additional thread divergence, the distribution network 130 retrieves active thread information of threads that follow a Taken path for the corresponding thread group, and transfers the fetched instruction to a corresponding SIMD lane 140 to execute the instruction. An operation in which a PC value is increased in operation 204 and the currently activated FEU 120 fetches an instruction located at the increased PC to process a thread, is performed repeatedly until a branch-join instruction is executed.

If SIMD lane availability information is written back in the SIMD lane manager 152 upon thread divergence in operation 206, IDs and the number of currently available SIMD lanes are obtained with reference to the SIMD lane manager 152 in operation 208. If any SIMD lane is currently available, the existence of any available FEU 120 is determined in operation 209.

If there is any available FEU 120, one or more FEUs 120 are additionally activated in operation 210, and a thread group to be processed in an additionally activated FEUs 120 is scheduled in operation 211. That is, as described above, one or more thread groups are scheduled based on the number of available SIMD lanes, memory access characteristics of a specific thread group, and computation latency, and then each of the scheduled thread groups are processed by the additionally activated FEUs 120, respectively.

By way of example where a thread group consists of sixteen threads, if four SIMD lanes 140 are available, the sixteen threads may be processed four threads at a time using the four SIMD lanes 140 by scheduling an SIMD width and an SIMD depth of the thread group to be 4, respectively, and then PC values of the threads may be increased. In another example in which three SIMD lanes 140 are available, two thread groups may be scheduled such that two SIMD lanes are assigned to process one thread group with an SIMD width of 2 and an SIMD depth of 8, and one SIMD lane 140 may be assigned to process the other thread group with an SIMD width of 1 and a SIMD depth of 16.

As described above, the additionally activated FEU 120 fetches an instruction located at the increased PC value in operation 201, and the fetched instruction is processed in an SIMD lane 140 assigned to each thread group.

All or some of the above described operations in a program flow, illustrated in FIG. 2, may be performed repeatedly. For example, from the point threads are diverged by a conditional branch until all the threads are converged, the number of any available SIMD lanes, a memory access pattern of a specific thread group, computation latency information, and the number of any available FEUs may change according to circumstances. That is, at a point when threads are diverged at a conditional branch, an SIMD lane may become available, but the number of available SIMD lanes may change according to various circumstances, for example, when a specific path of the conditional branch ends before others, or when a newly scheduled thread group is completely processed in an additionally activated FEU 120 before other thread groups. Therefore, operations 208 to 211 of scheduling thread groups based on SIMD lane availability status information may be performed repeatedly.

Meanwhile, if the currently activated FEU 120 fetches a branch-join instruction in operation 205 to converge divergent threads when reaching the end of a Taken path, whether a Not-Taken path is completely processed is determined in operation 213.

For example, if the N-STACK of the SIMD lane manager 512 is checked, and it is determined that a Not-Taken PC yet to be processed still remains in the N-STACK, the flow jumps into the Not-Taken PC in operation 216, and a subsequent instruction located at the Not-Taken PC is fetched in operation 201. If a branch-join instruction comes out at the end of the Not-Taken path in operation 205, any Not-Taken PC yet to be processed does not remain in the N-STACK in operation 213, so the divergent threads are converged in operation 214.

After the divergent threads are converged in operation 214, the FEU 120 retrieves pre-divergence SIMD lane usage status information from the N-STACK in operation 215 so as to continue processing the converged threads.

As described above, the method illustrated in FIG. 2 is merely an example of what the apparatus 100 is able to implement. That is, the apparatus 100 may appropriately manage thread divergence in various manners according to various exemplary embodiments.

Figure 3:
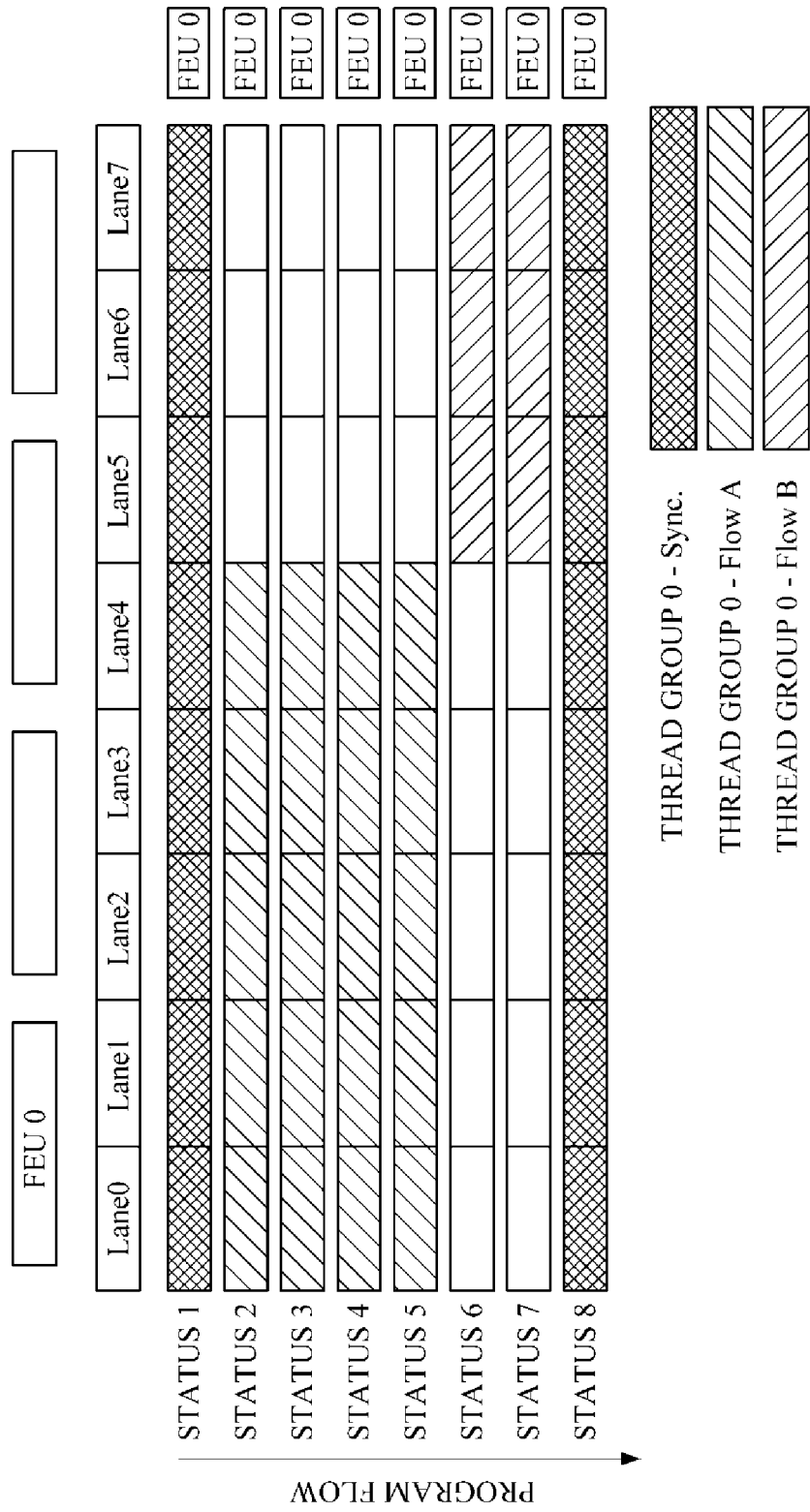
FIG. 3 is an example of SIMD lane statuses changed due to occurrence of thread divergence in a related art apparatus.
Figure 4:
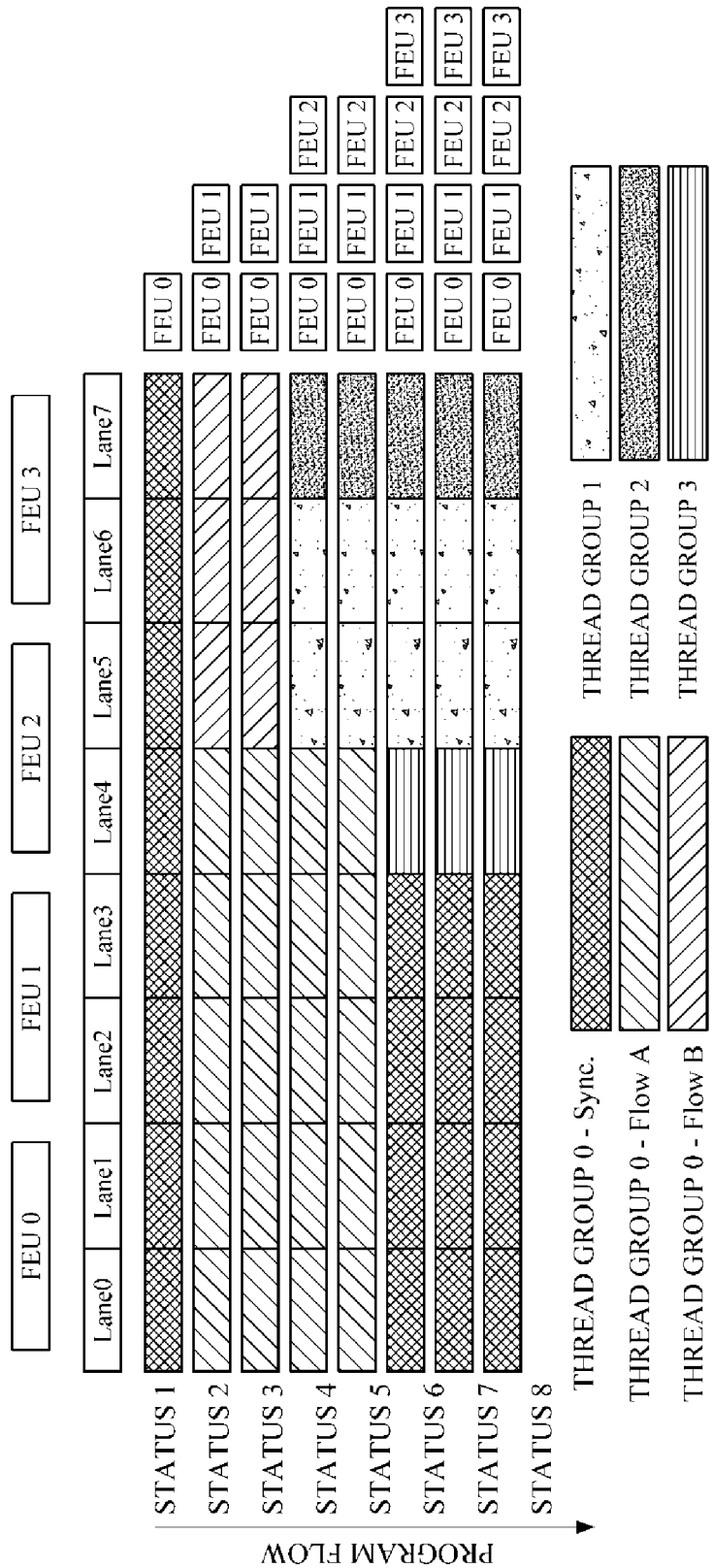
FIG. 4 is an example of SIMD lane statuses changed due to occurrence of thread divergence in an apparatus according to an exemplary embodiment.

FIG. 3 is a diagram illustrating SIMD lane statuses changed due to thread divergence in a related art apparatus. FIG. 4 is a diagram illustrating SIMD lane statuses changed due to thread divergence in an apparatus 100 according to an exemplary embodiment. Hereinafter, how the apparatus 100 schedules thread groups, and how SIMD lane statuses are changed due to the scheduling, will be described with reference to FIGS. 3 and 4.

FIG. 3 is a diagram illustrating SIMD lane statuses changed due to thread divergence in a related art SIMD-based data processing apparatus with a single FEU (e.g., FEU 0) and eight SIMD lanes (SL 0~SL 7).

At status 1, eight threads of the thread group 0 are respectively processed at eight SIMD lanes (SL 0~SL 7) through the single FEU (FEU 0).

At each of statuses 2 through 5, threads are diverged by a conditional branch, and five active threads following a Taken path are processed in five SIMD lanes (SL 0~SL 4), while the remaining three SIMD lanes (SL 5~SL 7) are idle.

Then, if the Taken path ends, and thus a branch-join instruction is fetched, a Not-Taken path, at statuses 6 an d7, is executed using the three once-idled SIMD lanes (SL 5~SL 7), while the five once-activated SIMD lanes (SL 0~SL 4) are idle.

At status 8, as the Not-Taken path ends, and thus the divergent threads are converged, the thread group 0 is continuously processed using the entire SIMD lanes (SL 0~SL 7).

As illustrated in FIG. 3, if threads are diverged due to a conditional branch in the middle of processing a specific thread group, one or more SIMD lane becomes idle, leading to processing performance degradation in the related art.

Referring to FIG. 4, an apparatus 100 according to an exemplary embodiment includes four FEUs (FEU 0~FEU 3) and eight SIMD lanes (SL 0~SL 7). At status 1, eight threads of a thread group 0 are respectively processed in all the SIMD lanes (SL 0~SL 7) through a single FEU 0.

At status 2, if threads of the thread group 0 are diverged by a conditional branch, the Taken path for the thread group 0 is executed through the FEU 0. Five threads following the Taken path, out of all threads of the thread group 0, are respectively processed using five SIMD lanes (SL 0~SL 4), while the remaining three SIMD lanes (SL 5~SL 7) are idle.

At this point, the apparatus 100 checks SIMD lane availability information to ascertain that three SIMD lanes (SL 5~SL 7) are available, and additionally activates FEU 1. Furthermore, the FEU 1 is controlled to execute the Not-Taken path for the thread group 0. The Taken path for thread group 0 ends at status 5, and the Not-Taken path for the thread group 0 ends at status 3.

At status 4, since the Not-Taken path for the thread group 0 ends at status 3, the three once-idled SIMD lanes (SL 5~SL 7) become available again, and the apparatus 100 checks changed SIMD lane availability information, and then additionally activates FEU 2. Then, the apparatus 100 schedules thread groups 1 and 2 to be processed using the FEUs 1 and 2. In FIG. 4, the thread group 1 to be processed through the FEU 1 is scheduled such that the thread group 1 is processed four times using two SIMD lanes (SLs 5 and 6), and then corresponding PC values are increased, while the thread group 2 to be processed through the FEU 2 is scheduled such that the thread group 2 is processed using a single SIMD lane (SL 7).

At status 6, the conditional branch for the thread group 0 ends, and all the divergent threads of the thread group 0 are converged. During this time, three SIMD lanes (SL 5~SL 7) are being used, and the five other SIMD lanes (SL 0~SL 4) become available, so that the thread group 0 is scheduled again using five available SIMD lanes (SL 0~SL 4). In FIG. 4, the convergent thread group 0 is scheduled to be processed using four SIMD lanes (SL 0~SL 3) through the FEU 0, and the thread group 3 is scheduled such that an additional FEU 3 is further activated to process the thread group 3 using the remaining one SIMD lane (SL 4).

The above scheduling operations may be performed repeatedly until a specific point in time is reached or until one or more program flows end, and a single thread group may be scheduled such that only one FEU (e.g., FEU 0) is activated after the specific point in time to process the thread group using the entire SIMD lanes (SL 0~SL 7).

As such, by appropriately activating one or more FEUs according to changeable SIMD lane availability status, and dynamically scheduling thread groups, it is possible to improve processing performance.

The methods and/or operations described above may be embodied as program instructions recorded, stored, or fixed in one or more computer-readable storage media and executed by a computer processor to perform the method and/or operations. The media may also include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner. Additionally, it is understood that the above-described components of the apparatus 100 may be implemented as hardware or software, and one or more of the above-described components may include one or more processors, circuitry, etc.

A number of exemplary embodiments have been described above. Nevertheless, it should be understood that various modifications may be made to the exemplary embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The invention claimed is:

1. An apparatus for managing divergent threads based on a Single Instruction Multiple Data (SIMD) architecture, the apparatus comprising:
   a plurality of Front End Units (FEUs) configured to fetch instructions of thread groups of a program flow; and
   a controller configured to schedule a thread group based on SIMD lane availability information, activate an FEU of the plurality of FEUs, and control the activated FEU to fetch an instruction for processing the scheduled thread group,
   wherein scheduling the thread group by the controller comprises,
      determining at least one thread group, among a plurality of thread groups, based on a number of idle SIMD lanes and an idle SIMD lane number included in the SIMD lane availability information, and
      scheduling an SIMD width to be processed for the at least one determined thread group, an SIMD depth which is greater than one to be processed for the at least one determined thread group, and an SIMD lane number to be processed for the at least one determined thread group, based on the number of idle SIMD lanes and the idle SIMD lane number included in the SIMD lane availability information, wherein the controller is configured to, in response to thread divergence occurring in the thread group that is scheduled due to a branch instruction, schedule, based on the SIMD lane availability information that is managed, another thread group to be processed through another FEU among the plurality of FEUs, and control the another FEU to fetch another instruction for execution by one or more SIMD lanes that are made available as a result of the thread divergence, and wherein the another thread group is independent and not divergent from the scheduled thread group.

2. The apparatus of claim 1, wherein the controller comprises an active thread manager configured to, in response to the thread divergence occurring in the thread group that is scheduled due to the branch instruction, manage active thread information of the thread group with the thread divergence.

3. The apparatus of claim 2, wherein the controller further comprises an SIMD manager configured to manage the SIMD lane availability information by checking any available SIMD lanes based on the active thread information that is managed.

4. The apparatus of claim 2, further comprising a distribution network configured to transfer the instruction fetched by the FEU that is activated to a corresponding SIMD lane based on the active thread information that is managed.

5. The apparatus of claim 4, wherein a plurality of SIMD lanes is provided, and each SIMD lane comprises an Execution Unit (EU) configured to execute a corresponding instruction transferred through the distribution network.

6. The apparatus of claim 1, wherein the controller is configured to schedule the thread group based on at least one of memory access characteristics, computation latency, and user input information with respect to the thread group.

7. The apparatus of claim 1, wherein the controller is configured to, before threads of the thread group that is scheduled are diverged, or after divergent threads of the thread group that is scheduled are converged, activate the FEU to fetch another instruction that controls the FEU that is activated to process the thread group using all SIMD lanes.

8. A method of managing divergent threads based on Simple Instruction Multiple Data (SIMD) architecture, the method comprising:

fetching, at a first Front End Unit (FEU) among a plurality of FEUs, an instruction of a first thread group;

determining, at the first FEU, whether threads of the first thread group are diverged due to the instruction that is fetched;

in response to determining that the threads of the first thread group are diverged, activating a second FEU among the plurality of FEUs;

scheduling, based on a number of idle SIMD lanes and an idle SIMD lane number included in SIMD lane availability information, a second thread group to be processed through the second FEU, the second thread group being independent and not divergent from the first thread group;

scheduling, based on the number of idle SIMD lanes and the idle SIMD lane number included in the SIMD lane availability information, an SIMD width to be processed for the second thread group, an SIMD depth which is greater than one to be processed for the second thread group, and an SIMD lane number to be processed for the second thread group; and fetching, at both the first FEU and the second FEU, instructions.

9. The method of claim 8, further comprising managing active thread information of each of the first thread group and the second thread group.

10. The method of claim 9, wherein the managing the active thread information comprises managing SIMD lane availability information by checking an available SIMD lane based on the active thread information of each of the first thread group and the second thread group.

11. The method of claim 8, further comprising, in response to the determining that the threads of the first thread group are diverged, managing SIMD lane usage status information that indicates information about any SIMD lane that was being used at a time shortly before the threads of the first thread group are diverged.

12. The method of claim 11, further comprising:

in response to the determining that the threads of the first thread group are diverged due to a conditional branch, jumping into a Taken Program Counter (PC).

13. The method of claim 11, further comprising:

determining whether the instruction fetched by the first FEU is a branch-join instruction;

in response to determining that the instruction fetched by the first FEU is the branch-join instruction, determining whether there is any Not-Taken Program Counter (PC) not processed due to thread divergence of the first thread group; and in response to a determination that there is no Not Taken PC not processed due to the thread divergence of the first thread group, fetching another instruction based on the SIMD lane usage status information to process the first thread group.

14. The method of claim 8, wherein the scheduling the second thread group comprises scheduling the second thread group based on at least one of memory access characteristics, computation latency, and user input information with respect to the second thread group.

15. A method of managing divergent threads based on Simple Instruction Multiple Data (SIMD) architecture, the method comprising:

scheduling, based on a number of idle SIMD lanes and an idle SIMD lane number included in SIMD lane availability information, a first thread group of a program flow;

scheduling, based on the number of idle SIMD lanes and the idle SIMD lane number included in the SIMD lane availability information, an SIMD width to be processed for the first thread group of the program flow, an SIMD depth which is greater than one to be processed for the first thread group of the program flow, and an SIMD lane number to be processed for the first thread group of the program flow;

activating a first FEU among a plurality of FEUs configured to fetch instructions for execution by SIMD lanes;

fetching, at the first FEU that is activated, a first instruction for processing the first thread group that is scheduled;

managing the SIMD lane availability information by checking any available SIMD lanes resulting from a thread divergence occurring in the first thread group that is scheduled due to a branch instruction;

scheduling, based on the SIMD lane availability information that is managed, a second thread group to be processed through a second FEU among the plurality of FEUs, the second thread group being independent and not divergent from the first thread group; and fetching, at the second FEU, a second instruction for execution by one or more first SIMD lanes that are made available as a result of the thread divergence.

16. The method of claim 15, further comprising, in response to the thread divergence occurring in the first thread group that is scheduled due to the branch instruction, managing active thread information of the first thread group with the thread divergence.

17. The method of claim 16, further comprising managing the SIMD lane availability information by checking any available SIMD lanes based on the active thread information that is managed.

18. The method of claim 15, further comprising:

scheduling, based on the SIMD lane availability information that is managed, a third thread group to be processed through a third FEU among the plurality of FEUs; and fetching, at the third FEU, instructions for execution by SIMD lanes that are made available as a result of the thread divergence.

19. The method of claim 16, further comprising transferring the instruction fetched by the first FEU that is activated to a corresponding SIMD land based on the active thread information that is managed.

20. A non-transitory computer readable recording medium having recorded thereon a program executable by a computer for performing the method of claim 9.

21. A non-transitory computer readable recording medium having recorded thereon a program executable by a computer for performing the method of claim 15.

* * * * *